United States Patent
Herffurth

(10) Patent No.: US 6,719,309 B1
(45) Date of Patent: Apr. 13, 2004

(54) MULTI-AXLE UNIT HAVING AT LEAST THREE AXLES

(75) Inventor: Rainer Herffurth, Fuldatal (DE)

(73) Assignee: DaimlerChrysler AG, Stuttgart (DE)

( * ) Notice: Subject to any disclaimer, the term of this patent is extended or adjusted under 35 U.S.C. 154(b) by 69 days.

(21) Appl. No.: 09/528,278

(22) Filed: Mar. 17, 2000

(30) Foreign Application Priority Data

Mar. 19, 1999 (DE) .......................................... 199 12 316

(51) Int. Cl.⁷ ............................................... B62D 61/12
(52) U.S. Cl. ..................................... 280/81.1; 280/80.1
(58) Field of Search ............................. 280/80.1, 81.1; 180/21, 22

(56) References Cited

U.S. PATENT DOCUMENTS

| | | | | |
|---|---|---|---|---|
| 3,895,818 A | * | 7/1975 | Fearon ...................... 280/81 R |
| 3,966,008 A | * | 6/1976 | Klaue ......................... 180/370 |
| 4,165,884 A | * | 8/1979 | Allison et al. ............. 280/81 R |
| 4,195,856 A | * | 4/1980 | Larson et al. ............. 280/81 R |
| 4,211,297 A | * | 7/1980 | Dunbar ...................... 180/24.02 |
| 4,284,156 A | * | 8/1981 | Carstensen et al. ...... 180/24.02 |
| 4,417,634 A | * | 11/1983 | Quaeck et al. ................ 180/22 |
| 4,790,606 A | * | 12/1988 | Reinecke ............... 188/1.11 E |
| 4,819,995 A | * | 4/1989 | Lohmann et al. ........... 303/110 |
| 4,862,987 A | * | 9/1989 | Legueu ........................ 180/233 |
| 5,415,466 A | * | 5/1995 | Breen et al. ............. 188/181 T |
| 5,570,755 A | * | 11/1996 | Fruhwirth et al. .......... 180/249 |
| 5,819,886 A | * | 10/1998 | Null ............................. 188/72.5 |
| 6,135,247 A | * | 10/2000 | Bodin et al. .......... 188/218 XL |
| 6,152,252 A | * | 11/2000 | Pettersson .................... 180/282 |

FOREIGN PATENT DOCUMENTS

| | | |
|---|---|---|
| DE | 37 23 493 | 1/1989 |
| DE | 41 14 861 | 11/1992 |
| DE | 196 32 515 | 4/1998 |

* cited by examiner

*Primary Examiner*—Lesley D. Morris
*Assistant Examiner*—L. Lum
(74) *Attorney, Agent, or Firm*—Kenyon & Kenyon

(57) ABSTRACT

A multi-axle unit for a semi-trailer that is towed by a tractor vehicle and has at least three axles, at least one of the axles of the multi-axle unit being capable of being configured as a lifting axle and/or steered axle and all axles except for at least one axle being brakable and equipped with axle brakes having axle brake disks, the axle brake disks defining an effective frictional radius that is the same as an effective frictional radius of brake disks of the tractor vehicle. The multi-axle unit, due to the particular configuration of its braking system, has a lower unsprung mass, requires less maintenance outlay, and moreover is more economical to purchase and maintain.

12 Claims, 1 Drawing Sheet

MULTI-AXLE UNIT HAVING AT LEAST THREE AXLES

FIELD OF THE INVENTION

The invention relates to a multi-axle unit for a semi-trailer that is towed by a tractor vehicle and has at least three axles, at least one of the axles of the multi-axle unit being capable of being configured as a lifting axle and/or steered axle.

BACKGROUND OF THE INVENTION

Tractor-trailer units having multi-axle units are known from German Patent Application No. 196 32 515 A1, among others. Lifting axles have previously been described in German Patent Application No. 41 14 861 A1, among others. In tractor-trailer units up to a permitted gross weight of, for example 40 tons, semi-trailers with three-axle chassis are generally used. The individual axles have single-tire wheels. In these known multi-axle units, all the wheels of the axles are generally equipped with wheel brakes. The brakes of at least two axles of the multi-axle units are equipped with accumulator brake cylinders for use as a parking brake.

The axle of a semi-trailer described in German Patent Application No. 196 32 515 A1 has one disk brake per wheel. The disk brakes used are of considerably smaller dimensions than the disk brakes of the tractor vehicle. Lastly, at least the dynamic wheel loads of the tractor vehicle are considerably greater than those of the semi-trailer, thus resulting in a lower braking force requirement there.

SUMMARY OF THE INVENTION

An object underlying the present invention is that of developing a multi-axle unit for semi-trailers that, due to a particular configuration of the braking system, has a lower unsprung mass, requires less maintenance outlay, exhibits safe driving characteristics, and moreover is more economical to manufacture, install, and maintain.

The present invention provides a multi-axle unit for a semi-trailer that is towed by a tractor vehicle and has at least three axles, at least one of the axles of the multi-axle unit being capable of being configured as a lifting axle and/or steered axle, wherein all axles of the multi-axle unit except for at least one axle are equipped with disk brakes; and the brake disks of the brakable axles of the multi-axle unit at least have the same effective frictional radius as the brake disks of the tractor vehicle. On the multi-axle unit, all axles except for at least one axle are equipped with disk brakes, the brake disks of the brakable axles of the multi-axle unit at least having the same effective frictional radius as the brake disks of the tractor vehicle.

DETAILED DESCRIPTION

Figure 1:
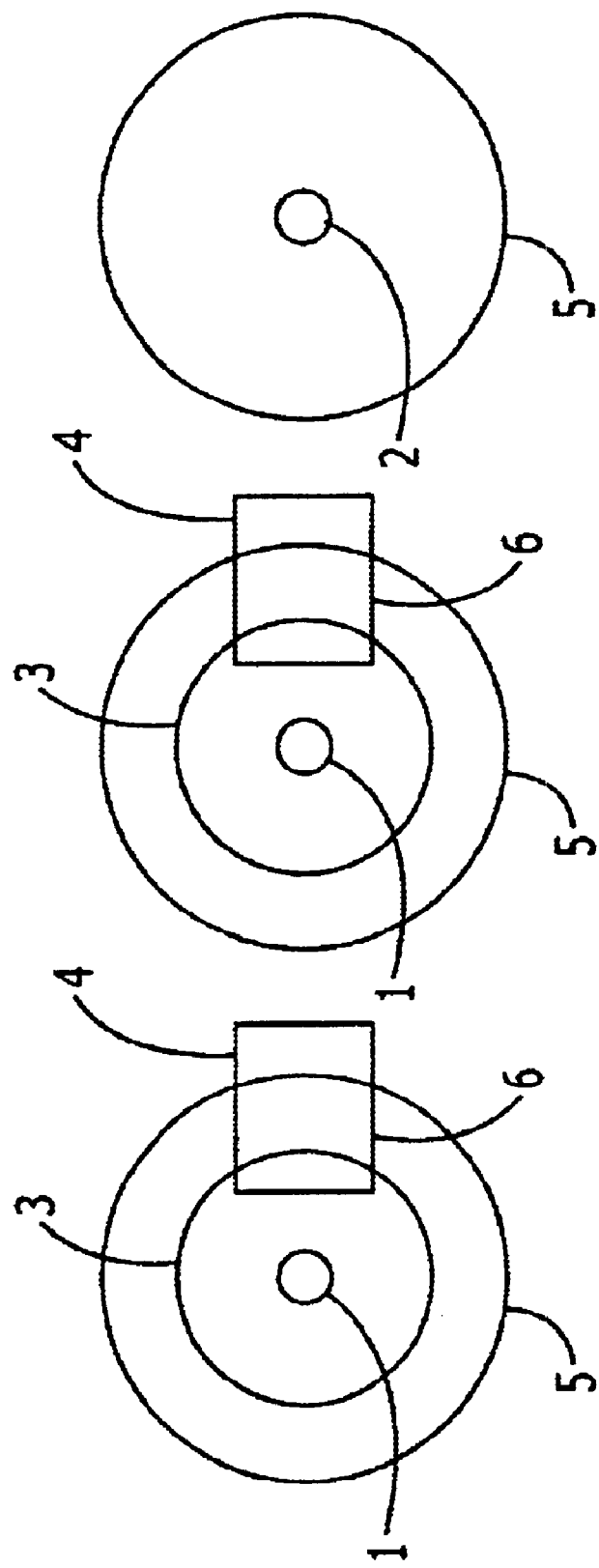
FIG. 1 shows a side view of an example of a multi-axle unit according to the present invention.

For vehicle class $0_4$, the minimum requirement for braking deceleration is 5.5 m/s². In order to achieve this braking deceleration, for example, in a semi-trailer having a three-axle chassis, it is sufficient to equip only two of three axles with disk brakes. The third, unbraked (i.e. nonbrakable) axle has the function of a simple carrying axle.

FIG. 1 shows a side view of one example of a multi-axle unit according to the present invention. Two of the axles 1 are configured as braked, or brakable, axles, and the third axle 2, is configured as an unbraked, or nonbrakable, axle. Each of the three axles 1, 2 have at least one wheel 5 attached at each end. The brakable axles 1, also include axle brakes 6 associated with them, the axle brakes in the example including axle brake disks 3 and axle brake calipers 4. (The axle brakes, axle brake discs 3, and axle brake calipers 4, are, of course, mounted on wheel 5 of axles 1, and not directly to the axle 1).

In the three-axle unit, the braked axles can be equipped with the complete wheel brakes of a tractor vehicle, since the brake disks of the tractor vehicle and of the semi-trailer have the same effective frictional radius. On the semi-trailer, the two braked axles handle all the braking work. As a rule, these are the two front axles of the three-axle unit. This configuration eliminates two wheel brakes on the three-axle unit, thus decreasing the unsprung mass in this case by about 250 kg as compared to conventional units.

In addition, maintenance outlay is lower, not only because two fewer brakes need to be maintained but also because all the brakes on the entire vehicle—i.e. on the tractor vehicle and on the semi-trailer—are of identical design. Mechanics can use the same knowledge, the same actions, and the same tools to check or maintain the brakes or replace parts. This also has a positive effect on the reliability of the checking and maintenance work. Shorter checking and maintenance time in fact improves the reliability of the braking systems.

In the event of a malfunction of the braking force control system, the result is also greater driving safety than with tractor-trailer units whose semi-trailers have conventional multi-axle units. In the event of fault-related overbraking of the multi-axle unit, when an unbraked carrying axle is present, for example, it guides the semi-trailer. While the locked wheels of the braked axles are slipping, the carrying axle maintains lateral guidance, so that the semi-trailer and thus the tractor-trailer unit remains in its lane.

Since not only spare parts but also ordinary consumable parts, for example the brake pads and brake disks, are of identical design for all the brakes of a tractor-trailer unit, stock maintenance outlay is reduced for motor carriers, repair shops, and manufacturers.

The unbraked carrying axle can be configured as a lifting axle. On so-called empty or high-volume trips, this axle can be lifted in order to reduce tire wear and improve the steerability of the multi-axle unit. If the lifting axle (see axle 2 in FIG. 1) is not equipped with wheel brakes, its lifting and locking mechanism can be of smaller dimensions, since the unbraked lifting axle is approximately 250 kg lighter than a braked one. The lifting axle is, in this context, the rear axle of the semi-trailer.

The simple carrying axle can also be configured as a steering axle. As a rule this does not necessitate, as previously with a braked axle, any change in the frame width of the semi-trailer in the region of this axle. The elimination of a bulky brake cylinder also makes possible, inter alia, a comparatively large wheel pivoting range. The steering axle can be embodied in autonomic or externally controlled fashion. The design outlay for manufacturing the otherwise very complex steering axle is considerably reduced by omitting the disk brakes.

The carrying axle can also be a combination steering axle and lifting axle. The carrying axles, at least, do not have dual tires.

The disk brakes are generally pneumatically actuated. Alternatively, they can also be actuated hydraulically or via a hydropneumatic pressure booster.

At least one of the axles that are brakable by way of disk brakes is equipped with accumulator brake cylinders so that the corresponding wheels can be used to immobilize the parked semi-trailer. In the case of a three-axle unit, for example, two axles are fitted with parking brakes.

What is claimed is:

1. A multi-axle unit for a semi-trailer that is towed by a tractor vehicle, the tractor vehicle having vehicle brakes including vehicle brake disks, the multi-axle unit comprising:

at least three axles, at least one of the axles configurable as at least one of a lifting and a steering axle, the at least three axles including at least one nonbrakable axle and at least two brakable axles; and axle wheel brakes associated with each of the brakable axles wherein each of the axle wheel brakes includes an axle wheel brake disk defining a frictional radius, the frictional radius of the axle wheel brake disk being the same as a frictional radius of the vehicle brake disk of the tractor vehicle.

2. The multi-axle unit as recited in claim 1 wherein each of the axle wheel brakes further includes an axle wheel brake caliper, and wherein each axle wheel brake caliper and axle wheel brake disk are virtually identical to a caliper and brake disk of each vehicle brake.

3. The multi-axle unit as recited in claim 1 wherein only one of the at least three axles is configured as a nonbrakable axle.

4. The multi-axle unit as recited in claim 1 wherein an axle disposed furthest from the tractor vehicle is configured as a nonbrakable axle.

5. The multi-axle unit as recited in claim 1 wherein at least one of the axles is configured as a lifting axle.

6. The multi-axle unit as recited in claim 5 wherein the lifting axle is one of the at least one nonbrakable axle.

7. The multi-axle unit as recited in claim 1 wherein at least one of the axles is configured as a steering axle.

8. The multi-axle unit as recited in claim 7 wherein the steering axle is one of the at least one nonbrakable axle.

9. The multi-axle unit as recited in claim 1 wherein each axle wheel brake includes a plurality of axle wheel brake parts, and each of the axle wheel brake parts corresponds to vehicle brake parts of the vehicle brakes.

10. The multi-axle unit as recited in claim 8 wherein the axle wheel brakes are pneumatically actuated.

11. The multi-axle unit as recited in claim 1 wherein at least one of the brakable axles is associated with a parking brake.

12. The multi-axle unit as recited in claim 1 wherein each axle of the unit includes single tire wheels.

* * * * *